Aug. 3, 1937.　　　　F. L. MAIN　　　　2,088,967
DEVICE FOR COOLING BRAKE DRUMS
Filed Aug. 10, 1936
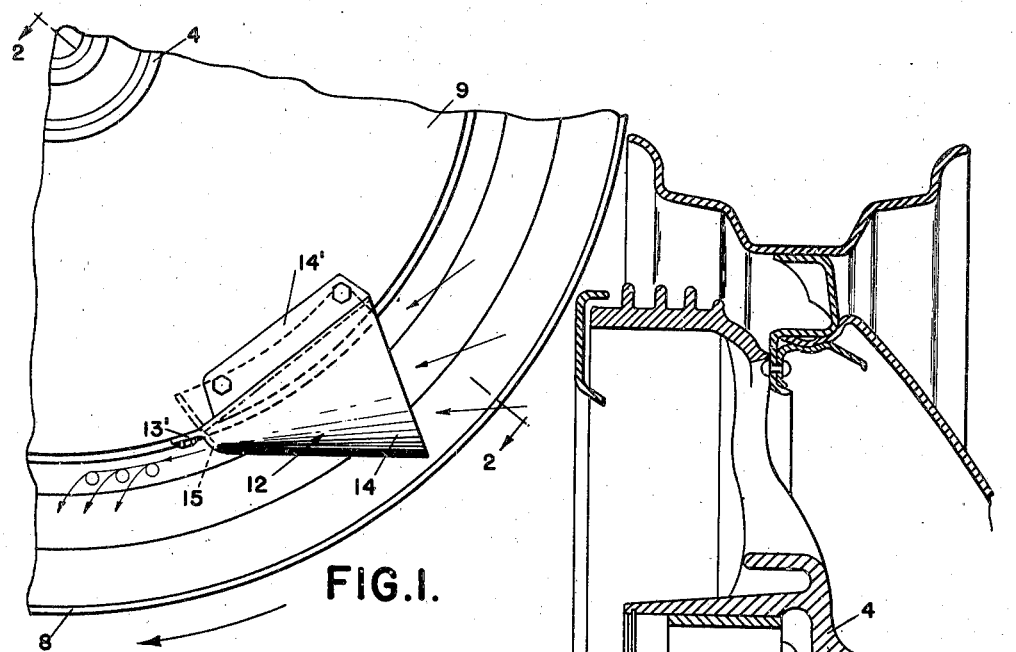
FIG.1.
FIG.3.
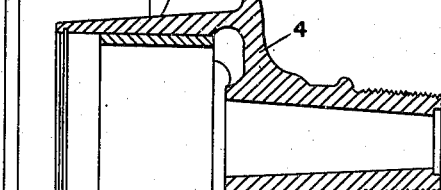
FIG.4.
FIG.2.
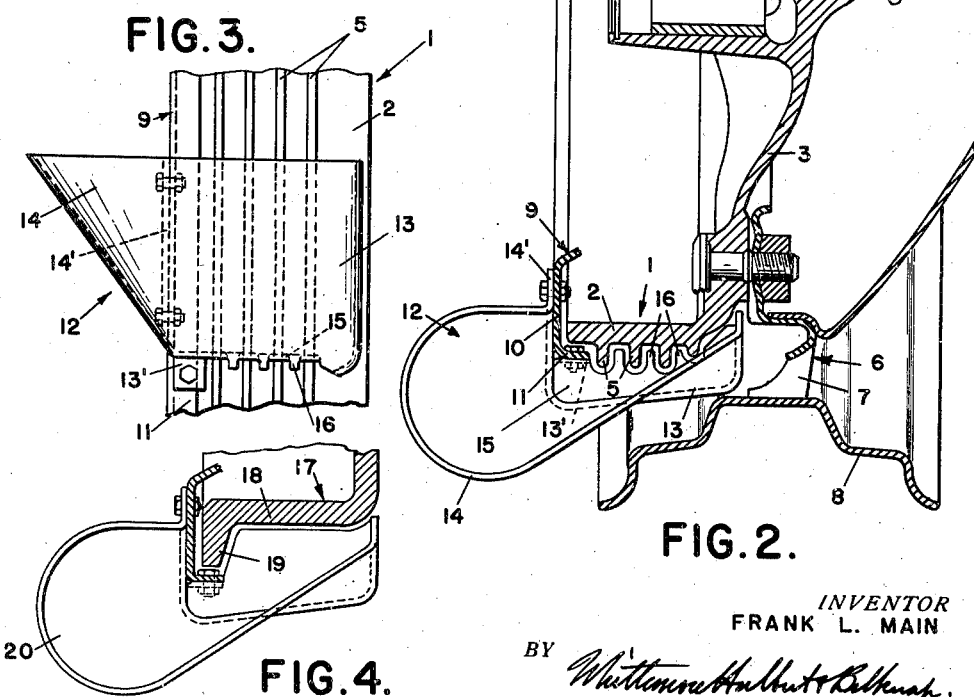
INVENTOR
FRANK L. MAIN
BY
ATTORNEYS Patented Aug. 3, 1937

2,088,967

UNITED STATES PATENT OFFICE 2,088,967

DEVICE FOR COOLING BRAKE DRUMS

Frank L. Main, Birmingham, Mich., assignor to Kelsey-Hayes Wheel Company, Detroit, Mich., a corporation of Delaware Application August 10, 1936, Serial No. 95,246

7 Claims. (Cl. 188—264)

The invention relates to devices for cooling brake drums and more particularly brake drums of motor vehicles.

The invention has for one of its objects to provide a device which will agitate the air adjacent the brake drum and more particularly adjacent the external surface of its brake flange to thereby assist in cooling the brake drum. The invention has for another of its objects to provide a device which has a part so positioned that it will collect air axially beyond the brake drum and direct this air upon the brake drum to facilitate its cooling.

These and other objects of the invention will become more apparent from the following description, taken in connection with the accompanying drawing, in which—

Figure 1 is an elevation taken from the inboard side of a portion of a wheel, brake drum and backing plate having applied thereto a cooling device showing an embodiment of my invention;

Figure 2 is a cross section partially on the line 2—2 of Figure 1;

Figure 3 is a bottom plan view of the cooling device and a portion of the brake drum and backing plate;

Figure 4 is a view similar to a portion of Figure 2 showing another embodiment of my invention.

As illustrated, 1 is the brake drum having the annular brake flange 2 and the web 3. 4 is the hub, this hub in the present instance being integral with the brake drum and the web of the latter being in the nature of spokes. The annular flange of the brake drum has an internal braking surface and an external annularly ribbed surface, there being a plurality of such ribs 5. 6 is the motor vehicle wheel having the body 7 detachably mounted in the present instance upon the brake drum and the tire carrying rim 8 secured to the periphery of the wheel body. This tire carrying rim, as shown, is of the drop-center type and it encircles a substantial portion of the brake drum. 9 is the backing plate which is mounted in the usual manner. This backing plate has the radially extending portion 10 at the end of the annular flange 2 and the transverse peripheral flange 11 which encircles the end of the brake flange.

12 is the brake drum cooling device. This device is preferably formed of sheet metal and is in the nature of a scoop having the portion 13 extending over the annular flange 2 and the portion 14 located axially beyond the annular flange in an inboard direction. This scoop is detachably secured to the backing plate to provide for changing the brake drum. As shown the scoop has the radial tongue 14' for securement to the radially extending portion 10 of the backing plate and the rearwardly extending tongue 13' at its rear end for securement to the transverse peripheral flange 11 of the backing plate, suitable securing means, such as bolts and nuts, being used. Both portions 13 and 14 are vertically flared toward the front of the motor vehicle and the portion 14 is also axially flared toward its front end. The front end of the scoop is open and the arrangement is such that during the forward movement of the motor vehicle air will pass into the scoop through the open front ends of both of its portions 13 and 14 and more particularly the latter, inasmuch as it is located axially in an inboard direction beyond both the rim of the wheel and the tire upon this rim. The scoop has its outboard side closed by an integral wall which preferably extends into proximity to the web of the brake drum.

For the purpose of agitating the air and directing it against the external surface and especially the ribs 5 of the brake flange 2, the scoop has the substantially radial wall 15 at its rear end which is provided with the fingers 16 extending between the ribs 5. This wall, including the fingers, is spaced from the ribs so that the air flowing through the scoop is compelled to flow axially into close proximity to the ribs and also radially into close proximity to the portions of the annular flange between and adjacent the ribs and thereby more effectively conduct the heat from the ribs and the intermediate and adjacent portion of the brake flange. During forward movement of the motor vehicle, the movement of the drum into the scoop, plus the head wind pressure in the scoop, tends to force the air against the ribs and the adjacent portions of the brake drum while the fingers between the ribs create turbulence in the air and increase radiation by convection.

The cooling device is preferably positioned at the lower front side of the brake drum with the bottom of its offset flared portion substantially parallel to the surface of the ground and spaced thereabove a height approximately equal to or greater than the combined radial depth of the rim and the tire.

As shown in Figure 4, the brake drum 17 has the annular brake flange 18 which has at its free edge the radially extending annular rib or flange 19. The brake drum cooling device 20 is very similar to the brake drum cooling device 12, with the exception that its rear wall is not provided with fingers, but its edge adjacent to but spaced from the brake flange conforms to the contour of this brake flange and the rib or flange at the edge of the brake flange.

What I claim as my invention is:

1. In a brake drum cooling device, the combination with a brake drum having external annular ribs and a backing plate for said brake drum, of a scoop secured to said backing plate and extending over said brake drum, said scoop being provided at its front end with means providing for the flow of air into said scoop and also being provided in rear of its front end with means for directing the air toward said ribs axially of said brake drum.

2. In a brake drum cooling device, the combination with a brake drum having external annular ribs and a backing plate for said brake drum, of a scoop secured to said backing plate and extending over said brake drum, said scoop being open at its front end and having fingers at its rear end extending between and spaced from said ribs.

3. In a brake drum cooling device, the combination with a brake drum having external annular ribs and a backing plate for said brake drum, of a scoop secured to said backing plate and extending over said brake drum, said scoop being open at its front end and having a wall at its rear end formed with fingers extending between said ribs, said wall including said fingers being spaced from said ribs.

4. In a brake drum cooling device, the combination with a brake drum having external annular ribs and a backing plate for said brake drum, of a scoop secured to said backing plate and extending over said brake drum, said scoop being flared toward its front end and having a portion at its front end located axially in an inboard direction beyond said brake drum, said portion being open for the flow of air into said scoop, and means upon said scoop in rear of its front end for directing the air toward said ribs axially of said brake drum.

5. In a brake drum cooling device, the combination with a revoluble brake drum having external annular ribs, of a scoop non-rotatably supported adjacent the brake drum and extending over said brake drum, said scoop being open at its front end and having fingers at its rear end extending between and spaced from the ribs.

6. In a brake drum cooling device, the combination with a revoluble brake drum having external annular ribs, of a scoop fixed against rotation adjacent the brake drum and extending over said brake drum, said scoop having means at its front end providing for the flow of air into the scoop, and means carried by the scoop spaced rearwardly from the front end for directing air toward the ribs and for compelling the air to flow in heat conducting relation to the ribs as it is discharged from the scoop.

7. In a brake drum cooling device, the combination with a revoluble brake drum for the road engaging wheel of a vehicle and having external annular ribs, of means non-rotatably supported adjacent the brake drum for collecting air upon forward motion of the vehicle, and means for directing air toward the ribs including fingers extending between and spaced from said ribs.

FRANK L. MAIN.